Patented Apr. 13, 1937

2,077,230

UNITED STATES PATENT OFFICE 2,077,230

PROCESS FOR BREAKING PETROLEUM EMULSIONS

Melvin De Groote, St. Louis, and Bernhard Keiser, Webster Groves, Mo., assignors to The Tret-O-Lite Company, Webster Groves, Mo., a corporation of Missouri No Drawing. Application November 6, 1936, Serial No. 109,542

18 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by our process consists of or comprises an amino fatty acid body of the kind hereinafter described, in the form of an acid, or in the form of a salt, ester or other suitable derivative, or in the form of a half-salt or half-ester. Amino fatty acids are fatty acids in which a hydrogen in the hydrocarbon chain or oxy-hydrocarbon chain, as differentiated from the carboxyl radical, has been replaced by an NH₂ radical or a substituted NH₂ radical, such as an NHR radical, or NRR' radical, where R and R' represent substituent hydrocarbon, oxyhydrocarbon, carboxy-hydrocarbon, or keto-carboxy-hydrocarbon radicals. In a general way, the chemical structure of such fatty amino acids may be indicated by the following formula:

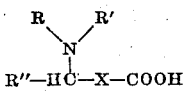

in which R'' represents a hydrocarbon or oxy-hydrocarbon chain, R and R' represent a hydrogen atom, a hydrocarbon radical, an oxy-hydrocarbon radical, a carboxy-hydrocarbon, or a keto-carboxy-hydrocarbon radical, and X represents a CH₂ radical or a chain of CH₂ radicals.

A single CH₂ radical or a series of connected CH₂ radicals, that is, the CH₂ radical chain which is attached to the carboxylic carbon atom, may be most conveniently referred to as a CH₂ radical linkage without reference to whether the linkage is based on a single CH₂ radical or a series of joined CH₂ radicals, or the like.

Obviously the various amino fatty acids or fatty acid bodies of the kind referred to may appear in more than one isomeric form. The various type formulas herein included are illustrative only and not intended to limit the process to the use of any particular isomer. Any isomeric form may be employed.

A suitable procedure for the manufacture of amino fatty acids is to react an unsaturated fatty acid in the form of a salt or in any other suitable form that prevents amide formation, with ammonia or with a primary or secondary amine. Such method of producing amino fatty acids and related materials is well known and is described in French Patent 793,504, dated January 27, 1936, to I. G. Farbenindustrie Aktiengesellschaft. In the reaction between an unsaturated fatty acid and ammonia or a selected amine, it is necessary to prevent amide-forming reactions, and thus ore must employ the fatty acid in the form of a salt or in some other suitable form which will prevent reactions involving the carboxyl radical. Reference hereinafter to a fatty acid, in connection with the ammonia or amine reaction, assumes that the fatty acid must be converted into a suitable form, such as a salt, prior to such reactions.

The following examples will illustrate methods of preparing amino fatty acids or salts thereof, which are suitable for use as demulsifying agents in the present process:

*Example 1:*—152 parts by weight of sodium oleate are mixed with 200 parts by weight of 26° Beaumé aqua ammonia. After thorough mixing, the mass is placed in an autoclave and heated at approximately 195–200° C. for four hours. At the end of this four hour period, the excess of ammonia is withdrawn. The reaction mass so obtained represents the sodium salt of aminostearic acid. The product may be used in the form of a sodium salt or the amino fatty acid may be liberated in the conventional manner, by the action of a dilute mineral acid such as dilute sulfuric acid or dilute hydrochloric acid. The amino fatty acid so obtained may be employed as such, or it may be neutralized with some other base, such as ammonia, monoethanolamine, diethanolamine, triethanolamine, caustic potash, butylamine, monoamylamine, cyclohexylamine, etc. The product may be reacted with calcium or magnesium oxide, or be converted into heavy metal salts, such as the copper salt, iron salt, etc. The fatty acid may be esterified in the usual manner by chemical combination with an alcohol, such as methyl alcohol, ethyl alcohol, propyl alcohol, butyl alcohol, amyl alcohol, hexyl alcohol, octyl alcohol, ethylene glycol, diethylene glycol, glycerol, diglycerol, diglycol, etc.

*Example 2.*—The same procedure described in Example 1 except that the 152 lbs. of sodium oleate is replaced by 168 lbs. of potassium ricinoleate.

*Example 3.*—The same procedure described in Example 1 except that the 152 lbs. of sodium oleate is replaced by 180 lbs. of sodium eruceate.

*Example 4.*—The same procedure described in Example 1 except that the 152 lbs. of sodium oleate is replaced by 155 lbs. of soap obtained by the saponification of linseed oil with caustic soda. In this instance, due to the increased unsaturation, one may employ either sufficient ammonia to form only one amino radical in the hydrocarbon chain, or one may increase the amount of ammonia and introduce more than one amino radical in the hydrocarbon chain.

*Example 5.*—The same procedure described in Example 1 except that the 152 lbs. of sodium oleate is replaced by 104 lbs. of sodium hendecenoate.

*Example 6.*—The same procedure described in Example 1 except that the 152 lbs. of sodium oleate is replaced by 293 lbs. of sodium salt of stearyl ricinoleic acid.

*Example 7.*—The same procedure described in Example 1 except that the 152 lbs. of sodium oleate is replaced by 151 lbs. of the sodium salt of octadecadiene 9–11, acid-1, or any other isomer if available.

*Example 8.*—Any of the procedures described in Examples 1 to 7, inclusive, except that the ammonia is replaced by an equivalent amount of butylamine.

*Example 9.*—Any of the procedures described in Examples 1 to 7, inclusive, except that the ammonia is replaced by an equivalent amount of monoamylamine or diamylamine.

*Example 10.*—Any of the procedures described in Examples 1 to 7, inclusive, except that the ammonia is replaced by an equivalent amount of monoethanolamine or diethanolamine.

*Example 11.*—Any of the procedures described in Examples 1 to 7, inclusive, except that the ammonia is replaced by a suitable amount of cyclohexylamine.

*Example 12.*—Any of the procedures described in Examples 1 to 7, inclusive, except that the ammonia is replaced by a suitable amount of piperidine.

*Example 13.*—Any of the procedures described in Examples 1 to 7, inclusive, except that the ammonia is replaced by a suitable amount of aniline.

*Example 14.*—Any of the procedures described in Examples 1 to 7, inclusive, except that the ammonia is replaced by a suitable amount of monoethanolamine.

The expression "fatty acids" herein employed, is intended to include unsaturated fatty acids of the kind which occur in natural oils and fats in the form of esters, such as the glycerides. These fatty acids are sometimes referred to as higher fatty acids, and occur in oils such as olive oil, cottonseed oil, soy bean oil, corn oil, castor oil, neat's-foot oil, and in marine oils such as menhaden oil, herring oil, sardine oil, pilchard oil, etc.

In some instances, these oils or the corresponding fatty acids, may be heated or oxidized so as to produce lower homologues. For instance, ricinoleic acid can be heated in such a manner as to produce hendecenoic acid, $C_{11}H_{22}O_2$, which is a lower homologue of oleic acid. Such materials are not fatty acids in the usual sense, since they do not occur as such in natural oils and fats, but they are herein considered as fatty acids, since they represent lower homologues or isologues, and have the characteristic properties of the common fatty acids. They are readily obtainable by well-known procedure, such as pyrolysis or oxidation. For instance, when castor oil, for example, is heated and oxidized so as to produce certain blown or oxidized oils, one may at least partially break down the molecule having 18 carbon atoms into two molecules having, for example, 7 carbon atoms and 11 carbon atoms. Such acids of lower molecular weight and derived from fatty acids, may be employed provided that they are unsaturated and provided that they have at least 8 carbon atoms. Hence the expression "fatty acids" as herein employed is intended to refer not only to the naturally occurring fatty acids previously described, but also these kindred products of lower molecular weight or products such as octadecadiene acid or the like. Similarly, it is intended that said expression include polymerized fatty acids, namely, poly acids or ester acids such as ricinoleyl ricinoleic acid, stearyl ricinoleic acid, palmityl ricinoleic acid, heptoyl ricinoleic acid, etc.

One may employ unsaturated polyketo fatty acid bodies of the kind described in U. S. Patent 2,039,063, dated April 28, 1936, to De Groote and Keiser. One may employ sulfo-aromatic fatty acids similar to Twitchell reagents, provided that they are obtained from such materials as linolic acid or the like, in which there is an ethylene linkage in the hydrocarbon chain, even after the introduction of the sulfo-aromatic radical.

It is obvious that instead of the fatty acids themselves in suitable form, such as the salts, one may employ fatty acids which have been changed in such a manner that they will still serve as the functional equivalents. For instance, ricinoleic acid may be acetylated, and such acetylated product in reactions with ammonia or a suitable amine, may serve just as satisfactorily as ricinoleic acid itself. Similarly, linseed oil or a highly unsaturated fish oil may be partially saturated with a halogen such as chlorine or bromine, and such a halogenated product may be converted into a salt such as the sodium salt and employed in place of the fatty acids of linseed oil. Ricinoleic acid may be sulfated in the hydroxyl position so that the ethylene linkage is substantially unchanged, and such a product may be converted into the sodium salt and used in place of ricinoleic acid or sodium ricinoleate. It is understood in the previous description that such changes or modifications do not detract from the derivative functioning in the same manner as the unchanged fatty acid or the fatty acid salt, and thus are included as the obvious chemical equivalents of the fatty acids or of their salts. Naturally, in converting oleic acid, for example, or ricinoleic acid, into an amino fatty acid, one must convert it into the salt such as the sodium salt, or in some form so as to prevent amide formation, as previously indicated. Where reference is made to reaction between the fatty acid and ammonia or substituted amine, it is intended to indicate the fatty acid after conversion into some suitable salt, such as the sodium salt, potassium salt, or any other suitable derivative that does not enter into amide formation. One difficulty involving the use of the fatty acid as such is that it might react with part of the selected amine or with the ammonia to form a salt, and thus one would have to use an added amount of the selected amine or of ammonia. There is no objection to this procedure if the nitrogenous body is sufficiently basic, and in some instances it may be convenient to do so. Thus where desirable, one may simply employ the fatty acid as such and add an excess of ammonia or the selected amine, so as to form the corresponding salt prior to ammonolysis.

Our preferred reagents are obtained by the saponification of partially unsaturated blown oils. We are fully aware of the fact that when various blown oils are combined with caustic soda, caustic potash, or the like, so as to form salts or soaps, the product so obtained may be different in character from the unsaponified material. In other words, not only does saponification take place in the sense that an acidic hydrogen or its equivalent, such as a hydrocarbon radical, is replaced by a metallic atom, but other changes may take place so that the product after saponification, as far as the organic part of the salt or soap is concerned, may be different in character from the original blown oil. However, such material after saponification is entirely suitable for use in preparing the reagent employed in our process. We are aware that demulsifying agents have been prepared by subjecting unsaponified blown oils to the action of ammonia or a selected amine. We desire to point out that the reagents of the kind contemplated for use in the present process are obtained only by treating the salts of saponified blown oils with ammonia or a suitable amine, and also provided that the fatty material is at least partially unsaturated in nature so as to have an iodine number of approximately 40 or higher. Such blown oils may be properly referred to as being partially oxidized.

Patents which describe conventional blown oils or conventional methods of making blown oils for various purposes include the following: U. S. Patent No. 1,929,399, dated Oct. 3, 1933, to Fuchs; No. 1,969,387, dated Aug. 7, 1934, to Tumbler; No. 2,023,979, dated Dec. 10, 1935, to Stehr; No. 2,041,729, dated May 26, 1936, to Seymour; and No. 1,984,633, dated Dec. 18, 1934, to De Groote and Keiser.

Mild oxidation of castor oil (see "Chemical Technology and Analysis of Oils, Fats and Waxes", by Lewkowitsch, 6th Edition, vol 2, page 406) produces relatively small modifications in certain important chemical indices, such as the iodine value, the acetyl value, and the saponification value. If drastic oxidation takes place, either by continued mild oxidation, or by more vigorous oxidation at the very beginning of the reaction, as induced by either a higher temperature of reaction, or the presence of a catalyst, such as alpha pinene, manganese ricinoleate, etc., then one obtains an oxidized oil having characteristics which clearly indicate that drastic oxidation has taken place. These indices of drastic oxidation are a relatively low iodine value, such as 65 or less, and may be as low as 40 or thereabouts; a saponification value of 215 to 285 or thereabouts; an acetyl value of approximately 160 to 200; an increased viscosity; a specific gravity of almost 1 or even a trifle over 1 at times; and in absence of other coloring matter, a deep orange color.

Drastically oxidized castor oil can be prepared by well known methods, or such products can be purchased in the open market under various trade names, such as "blown castor oil", "bodied castor oil", "blended castor oil", "blended bodied castor oil", "processed castor oil", "oxidized castor oil", "heavy castor oil", "viscous castor oil", etc. These various names appear to be applied to drastically oxidized castor oils which are different in degree but not different in kind. Such oils are only partially oxidized in the sense that they have a significant iodine value as indicated above.

In producing the demulsifying agent employed in our process, we prefer to use caustic soda and to completely saponify a drastically oxidized castor oil having approximately the following characteristics:

| | |
|---|---|
| Acid number | 15.1 to 25.0 |
| Saponification number | 230.5 to 274.0 |
| Iodine number | 43.5 to 55.0 |
| Acetyl number | 164.0 to 192.0 |
| Hydroxyl value | 188.0 to 220.0 |
| Percent unsaponifiable matter | 1.1 |
| Percent nitrogen | 0.0 |
| Percent SO₃ | 0.0 |
| Percent ash | Trace |

The sodium soap so obtained is analyzed so as to determine a mean molecular weight for the fatty acids present in combined form. The calculated molecular weight of the sodium salts are then determined. We then employ the same procedure outlined in Example 1, replacing the 152 lbs. of sodium oleate by an equivalent amount of saponified blown oil, which ordinarily will be about 132 lbs. The sodium salt so obtained may be used as such or as previously stated, the free fatty acid may be liberated.

A demulsifying agent that is even more effective in some instances, may be obtained by the partial esterification of a polyhydric alcohol with an amino fatty acid. Such a compound is characterized by the presence of one or more residual hydroxyls, derived from the polyhydric alcohol employed in esterification. For instance, aminostearic acid or aminohydroxystearic acid can be reacted with glycerol, ethylene glycol, glycidol, ethylene oxide, or the like, so as to produce compounds of this type. The materials are also readily prepared by reacting one mole of sodium aminostearate or sodium aminohydroxystearate with one mole of glycerol chlorhydrin, so as to form glycerol mono aminostearate or glycerol mono aminohydroxystearate. Sodium aminohydroxystearate is best prepared by the ammonolysis of sodium ricinoleate. Glycerol mono aminohydroxystearate is a particularly effective demulsifying agent.

The process of subjecting the salt or soap of the unsaturated fatty body or unsaturated fatty acid to ammonia or to a suitable primary or secondary amine will be referred to as ammonolysis. It is understood that ammonolysis is not limited to reaction with ammonia, but also includes reaction with primary or secondary amines. Indeed, one may employ various primary or secondary amines such as butylamine, propylamine, amylamine, monoethanolamine, diethanolamine, monopropanolamine, dipropanolamine, cyclic amines, such as cyclohexylamine, piperidine, or aromatic amines, such as aniline, aralkyl amines, such as benzylamine, etc. As characteristic of the various amines which may be employed, reference is made to the primary and secondary amines as shown on pages 188–189 of "Dictionary of Applied Chemistry", Thorpe, vol. 1 (1921). It is also obvious that any equivalent functional derivative may be employed. It is obvious that oxidized fatty acids, such as oxidized ricinoleic acid and the like, may be considered as the equivalent of the corresponding oxidized fatty oil, such as oxidized castor oil, and such materials may be employed just as suitably. In other words, these materials would be converted into a sodium salt, for example, and then subjected to ammonolysis. It is understood that ammonolysis need not necessarily be limited to the use of aqueous ammonia, but if suitable reactions would be obtained with gaseous ammonia or anhydrous ammonia or concentrated ammonia of other strength, such materials might be employed. As to various factors concerned in ammonolysis, see "Unit Processes in Organic Synthesis", Groggins, chapter 6, page 272, et seq. (1935).

As previously stated, one may employ the amino fatty acid or it may be converted into a salt or ester. Such change involves the acidic hydrogen of the carboxyl radical. Therefore, in the claims, the expression "acidic hydrogen equivalent" is used in its obvious meaning, that is, to denote an acidic (ionizable) hydrogen atom or a metallic atom which replaces it in the case of a salt, or an organic radical which may replace it in the case of an ester.

In the claims, reference is made to reaction between ammonia or a suitable amine and the unsaturated fatty body in the form of a salt. It is understood that the salt is employed because it is the simplest form in which the carboxyl radical is rendered inactive so as to prevent amide formation. It is understood that any other derivative which would similarly prevent amide formation and act the same as a salt is the functional equivalent of a salt, and is contemplated within the meaning of the word "salt" as employed.

The various primary or secondary amines employed in the manufacture of the demulsifying agent of the present process, may be replaced by some variant or derivative which would serve as a functional equivalent. For instance, if an amino fatty acid is prepared from ammonia or a primary amine, the compound itself, that is, the amino fatty acid, may be considered as still being a primary amine or a secondary amine, depending on whether or not it was derived from ammonia or from a primary amine. Obviously such a material might react with another molecule of an unsaturated fatty acid in the form of a salt, or some other suitable compound, so as to yield a compound in which a single nitrogen atom served as the linkage between two fatty acid radicals, as indicated by the following type formula, in which the characters have their previous significance:

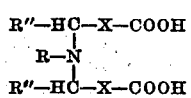

Another valuable type of demulsifying agents belonging to the class employed in the present process, is obtained by a reaction between an amino fatty acid and an acid anhydride, such as phthalic anhydride, maleic anhydride, etc. The anhydrides of dibasic acids with the carboxyl group attached to adjacent carbon atoms (e. g., such acids as succinic, maleic, and phthalic) react with ammonia and amines, particularly primary amines, according to the following scheme:

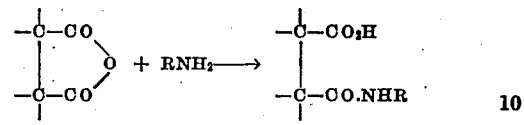

(see "Reactions of Organic Compounds", W. J. Hickinbottom, 1936, p. 198).

If phthalic anhydride, for example, and an amino fatty acid are reacted, the reaction proceeds as follows:

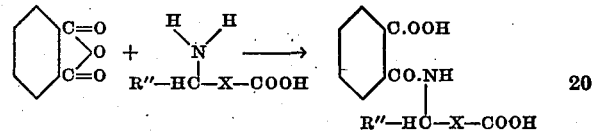

It is to be noted that the amino fatty acids of the kind just described may be dibasic acids, insofar that there is a carboxylic radical attached to the fatty acid chain, and also a carboxyl radical attached to an aromatic nucleus, in the event that the compound is derived from phthalic anhydride or the like. Either one or both of the carboxylic hydrogen atoms may be replaced in the conventional manner by a metallic atom or by an organic radical. In such instances where one of the acidic hydrogen atoms is replaced by a metallic atom or by an organic radical and the other acidic hydrogen atom is not replaced, one obtains half salts or half esters.

In the claims, the invention in its broadest aspect is directed to break petroleum emulsions by means of an amino fatty acid body as described. This characterization is intended to cover the invention broadly, including the keto carboxy type and the two more complex types described immediately preceding. The simpler types, in which an amino hydrogen is replaced by a hydrocarbon residue or an oxy-hydrocarbon residue, will be characterized by type formulas which clearly bring out this differentiation.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, dead oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practicing our process, a treating agent or demulsifying agent of the kind described above may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately one part of treating agent to 500 parts of emulsion, up to one part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500, above referred to, may be required. In treating fresh emulsion, i. e., emulsions that will yield readily to the action of chemical demulsifying agents, the ratio of 1:30,000, above referred to, may be sufficient to produce highly satisfactory results. In general, we have found that for an average petroleum emulsion a ratio of 1 part of treating agent to 5,000 or 10,000 parts of emulsion will usually be found to produce commercially satisfactory results.

Having thus described our invention, what we claim as new and desire to secure by Letters Patent, is:

1. A process for breaking petroleum emulsions of the water-in-oil type which consists in subjecting the emulsion to the action of a demulsifying agent comprising an amino fatty acid body, characterized by the fact that the amino nitrogen atom is attached to the long carbon chain, said chain containing not less than eight carbon atoms.

2. A process for breaking petroleum emulsions of the water-in-oil type which consists in subjecting the emulsion to the action of a demulsifying agent comprising an amino fatty acid body, said amino fatty acid body being of the following type formula:

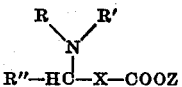

in which R" represents a hydrocarbon or oxyhydrocarbon chain; R and R' represent a hydrogen atom, a hydrocarbon radical, or an oxyhydrocarbon radical; X represents a $CH_2$ radical linkage; COO is the conventional carboxyl radical residue; and Z represents an acidic hydrogen equivalent, and the chain R"—HC—X, being characterized by containing not less than eight carbon atoms.

3. A process for breaking petroleum emulsions of the water-in-oil type which consists in subjecting the emulsion to the action of a demulsifying agent comprising an amino fatty acid body, characterized by being derived from a partially oxidized fatty acid glyceride; said amino fatty acid body being of the following type formula:

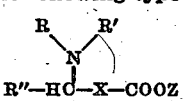

in which R" represents a hydrocarbon or oxyhydrocarbon chain; R and R' represent a hydrogen atom, a hydrocarbon radical, or an oxyhydrocarbon radical; X represents a $CH_2$ radical linkage; COO is the conventional carboxyl radical residue; and Z represents an acidic hydrogen equivalent, and the chain R"—HC—X, being characterized by containing not less than eight carbon atoms.

4. A process for breaking petroleum emulsions of the water-in-oil type which consists in subjecting the emulsion to the action of a demulsifying agent comprising an amino fatty acid body, characterized by being derived from partially oxidized castor oil; said amino fatty acid body being of the following type formula:

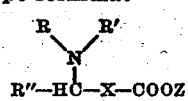

in which R" represents a hydrocarbon or oxyhydrocarbon chain; R and R' represent a hydrogen atom, a hydrocarbon radical, or oxyhydrocarbon radical; X represents a $CH_2$ radical linkage; COO is the conventional carboxyl radical residue; and Z represents an acidic hydrogen equivalent, and the chain R″—HC—X, being characterized by containing not less than eight carbon atoms.

5. A process for breaking petroleum emulsions of the water-in-oil type which consists in subjecting the emulsion to the action of a demulsifying agent comprising an amino fatty acid body, characterized by being derived from partially oxidized castor oil and ammonia; said amino fatty acid body being of the following type formula:

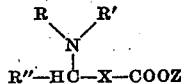

in which R″ represents a hydrocarbon or oxyhydrocarbon chain; R and R′ represent a hydrogen atom, a hydrocarbon radical or an oxyhydrocarbon radical; X represents a $CH_2$ radical linkage; COO is the conventional carboxyl radical residue; and Z represents an acidic hydrogen equivalent, and the chain R″—HC—X, being characterized by containing not less than eight carbon atoms.

6. A process for breaking petroleum emulsions of the water-in-oil type which consists in subjecting the emulsion to the action of a demulsifying agent comprising an amino fatty acid body, characterized by being derived from partially oxidized castor oil and an aromatic amine; said amino fatty acid body being of the following type formula:

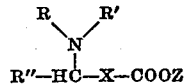

in which R″ represents a hydrocarbon or oxyhydrocarbon chain; R and R′ represent a hydrogen atom, a hydrocarbon radical, or oxyhydrocarbon radical; X represents a $CH_2$ radical linkage; COO is the conventional carboxyl radical residue; and Z represents an acidic hydrogen equivalent, and the chain R″—HC—X, being characterized by containing not less than eight carbon atoms.

7. A process for breaking petroleum emulsions of the water-in-oil type which consists in subjecting the emulsion to the action of a demulsifying agent comprising an amino fatty acid body, characterized by being derived from partially oxidized castor oil and an aliphatic amine; said amino fatty acid body being of the following type formula:

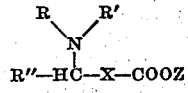

in which R″ represents a hydrocarbon or oxyhydrocarbon chain; R and R′ represent a hydrogen atom, a hydrocarbon radical or oxyhydrocarbon radical; X represents a $CH_2$ radical linkage; COO is the conventional carboxyl radical residue; and Z represents an acidic hydrogen equivalent, and the chain R″—HC—X, being characterized by containing not less than eight carbon atoms.

8. A process for breaking petroleum emulsions of the water-in-oil type which consists in subjecting the emulsion to the action of a demulsifying agent comprising an amino fatty acid body, characterized by being derived from partially oxidized castor oil and a primary aliphatic amine; said amino fatty acid body being of the following type formula:

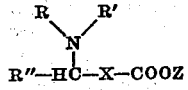

in which R″ represents a hydrocarbon or oxyhydrocarbon chain; R and R′ represent a hydrogen atom, a hydrocarbon radical, or oxyhydrocarbon radical; X represents a $CH_2$ radical linkage; COO is the conventional carboxyl radical residue; and Z represents an acidic hydrogen equivalent, and the chain R″—HC—X, being characterized by containing not less than eight carbon atoms.

9. A process for breaking petroleum emulsions of the water-in-oil type which consists in subjecting the emulsion to the action of a demulsifying agent comprising an amino fatty acid body, characterized by being derived from partially oxidized castor oil and a primary aliphatic hydroxy amine; said amino fatty acid body being of the following type formula:

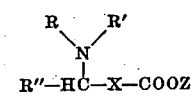

in which R″ represents a hydrocarbon or oxyhydrocarbon chain; R and R′ represent a hydrogen atom or an oxyhydrocarbon radical; X represents a $CH_2$ radical linkage; COO is the conventional carboxyl radical residue; and Z represents an acidic hydrogen equivalent, and the chain R″—HC—X, being characterized by containing not less than eight carbon atoms.

10. A process for breaking petroleum emulsions of the water-in-oil type which consists in subjecting the emulsion to the action of a demulsifying agent comprising an amino fatty acid body, characterized by being derived from partially oxidized castor oil and monoethanolamine; said amino fatty acid body being of the following type formula:

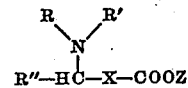

in which R″ represents a hydrocarbon or oxyhydrocarbon chain; R and R′ represent a hydrogen atom or an oxyhydrocarbon radical; X represents a $CH_2$ radical linkage; COO is the conventional carboxyl radical residue; and Z represents an acidic hydrogen equivalent, and the chain R″—HC—X, being characterized by containing not less than eight carbon atoms.

11. A process for breaking petroleum emulsions of the water-in-oil type which consists in subjecting the emulsion to the action of a demulsifying agent comprising a product obtained by reaction between unsaturated fatty salt derived from a fatty acid having at least eight carbon atoms, and a reagent selected from the class consisting of ammonia, primary and secondary amines, and conducted in such a manner that the ethylene linkage becomes substantially saturated.

12. A process for breaking petroleum emulsions of the water-in-oil type which consists in subjecting the emulsion to the action of a demulsifying agent comprising a product obtained by reaction between unsaturated fatty salt derived from a fatty acid having at least 8 carbon atoms and a reagent selected from the class consisting of ammonia, primary, and secondary amines, and conducted in such a manner that the ethylene linkage becomes substantially saturated with the introduction of an NRR radical, in which R represents a hydrogen atom, a hydrocarbon radical, or an oxyhydrocarbon radical.

13. A process for breaking petroleum emulsions of the water-in-oil type which consists in subjecting the emulsion to the action of a demulsifying agent comprising a product obtained by reaction between a partially oxidized blown oil salt and a reagent selected from the class consisting of ammonia, primary, and secondary amines, and conducted in such a manner that the ethylene linkage becomes substantially saturated with the introduction of an NRR radical, in which R represents a hydrogen atom, a hydrocarbon radical, or an oxyhydrocarbon radical.

14. A process for breaking petroleum emulsions of the water-in-oil type which consists in subjecting the emulsion to the action of a demulsifying agent comprising a product obtained by reaction between a partially oxidized castor oil salt and a reagent selected from the class consisting of ammonia, primary and secondary amine, and conducted in such a manner that the ethylene linkage becomes substantially saturated with the introduction of an NRR radical, in which R represents a hydrogen atom, a hydrocarbon radical, or an oxyhydrocarbon radical.

15. A process for breaking petroleum emulsions of the water-in-oil type which consists in subjecting the emulsion to the action of a demulsifying agent comprising a product obtained by reaction between a partially oxidized castor oil salt and ammonia, conducted in such a manner that the ethylene linkage becomes substantially saturated with the introduction of an NHH radical.

16. A process for breaking petroleum emulsions of the water-in-oil type which consists in subjecting the emulsion to the action of a demulsifying agent comprising a product obtained by reaction between a partially oxidized castor oil salt and a primary amine, conducted in such a manner that the ethylene linkage becomes substantially saturated with introduction of an NRR radical in which one occurrence of R represents a hydrogen atom and the other occurrence of R represents a hydrocarbon radical or an oxyhydrocarbon radical.

17. A process for breaking petroleum emulsions of the water-in-oil type which consists in subjecting the emulsion to the action of a demulsifying agent comprising a product obtained by reaction between a partially oxidized castor oil salt and a primary hydroxy amine conducted in such a manner that the ethylene linkage becomes substantially saturated with the introduction of an NRR radical, in which one occurrence of R represents a hydrogen atom and the other occurrence of R represents an oxyhydrocarbon radical.

18. A process for breaking petroleum emulsions of the water-in-oil type which consists in subjecting the emulsion to the action of a demulsifying agent comprising a product obtained by reaction between a partially oxidized castor oil salt and monoethanolamine, conducted in such a manner that the ethylene linkage becomes substantially saturated.

MELVIN DE GROOTE.
BERNHARD KEISER.